(12) United States Patent
Youn et al.

(10) Patent No.: US 6,558,776 B1
(45) Date of Patent: May 6, 2003

(54) GLASS SUBSTRATE FOR LIQUID CRYSTAL DISPLAY DEVICE

(75) Inventors: Won Gyun Youn, Daeku-shi (KR); In Jae Chung, Kyungsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/422,982

(22) Filed: Oct. 22, 1999

(30) Foreign Application Priority Data

Oct. 22, 1998 (KR) .......................................... 98-44375

(51) Int. Cl.$^7$ .......................... B32B 3/00; C09K 19/00; B44C 1/22
(52) U.S. Cl. ..................... 428/172; 428/1.62; 428/166; 428/188; 428/192; 216/97
(58) Field of Search ................................ 349/158, 160; 428/172, 166, 188, 1.1, 1.62, 192; 216/52, 97, 108

(56) References Cited

U.S. PATENT DOCUMENTS

| | | |
|---|---|---|
| 2,628,160 A | 2/1953 | Stookey |
| 3,689,333 A | 9/1972 | Hillhouse |
| 3,756,898 A | 9/1973 | Frantzen et al. |
| 3,869,313 A | 3/1975 | Jones et al. |
| 4,125,594 A | 11/1978 | Su et al. |
| 4,147,581 A | 4/1979 | Nelson |
| 4,240,880 A | 12/1980 | Tsuchibuchi et al. |
| 4,332,649 A | 6/1982 | Sälzle |
| 4,341,841 A | 7/1982 | Ohno et al. |
| 4,482,425 A | 11/1984 | Battey |
| 4,501,636 A | 2/1985 | Valley |
| 4,624,729 A | 11/1986 | Bresciani et al. |
| 4,715,686 A | 12/1987 | Iwashita et al. ......... 350/339 R |
| 4,826,556 A | 5/1989 | Kobayashi .................. 156/345 |
| 4,830,899 A * | 5/1989 | Nakahashi et al. ......... 428/137 |
| 4,846,868 A | 7/1989 | Aratani |

(List continued on next page.)

FOREIGN PATENT DOCUMENTS

| | | |
|---|---|---|
| DE | 1920009 | 10/1970 |
| DE | 1 920 009 | 10/1970 |
| DE | 36 11 387 | 10/1987 |
| DE | 38 53 904 | 10/1995 |
| EP | 0 474 474 | 3/1992 |
| EP | 0 586 147 | 3/1994 |
| EP | 0 659 521 | 6/1995 |
| FR | 1.065.718 | 12/1958 |
| FR | 1 200 180 | 12/1959 |
| FR | 1200180 | 12/1959 |
| GB | 829605 | 3/1960 |
| GB | 2 178 894 | 2/1987 |
| GB | 2 178 895 | 2/1987 |
| JP | 60-163435 | 8/1985 |
| JP | 01-189631 | 7/1989 |
| JP | 02-138459 | 5/1990 |
| JP | 02-141703 | 5/1990 |
| JP | 02-196222 | 8/1990 |
| JP | 03-022390 | 1/1991 |
| JP | 04-116619 | 4/1992 |
| JP | 4-371926 | 12/1992 |
| JP | 05-61011 | 3/1993 |
| JP | 5-249422 | 9/1993 |
| JP | 5-249423 | 9/1993 |
| JP | 07-168172 | 7/1995 |

OTHER PUBLICATIONS

Von Bernd Hartmann, "Neue Recyclingtechniken und Abwasser—behandlungsmethoden", *Technische Rundschau*, 37/90, pp. 104–107 & 109.

Primary Examiner—Donald J. Loney
(74) Attorney, Agent, or Firm—McKenna Long & Aldridge LLP

(57) ABSTRACT

A glass substrate for liquid crystal display device includes a plurality of zig-zag type exhausting ports for exhausting the inner gas in the cells of the glass substrate to the outer region of the glass substrate when the cells are laminated to each other. Opening regions of the glass substrate except for the exhausting port are blocked by the residuum being generated when the substrate is etched by the etchant.

25 Claims, 4 Drawing Sheets

U.S. PATENT DOCUMENTS

| | | |
|---|---|---|
| 4,886,590 A | 12/1989 | Tittle |
| 4,953,952 A | 9/1990 | Okumura et al. |
| 4,980,017 A | 12/1990 | Kaji et al. .................. 156/642 |
| 5,000,795 A | 3/1991 | Chung et al. ................. 134/37 |
| 5,002,627 A | 3/1991 | Scheithauer et al. |
| 5,082,518 A | 1/1992 | Molinaro ..................... 156/345 |
| 5,112,437 A | 5/1992 | Watanabe et al. |
| 5,112,453 A | 5/1992 | Behr et al. ................ 204/129.2 |
| 5,159,787 A | 11/1992 | Suenaga et al. |
| 5,164,018 A | 11/1992 | Barcelona, Jr. |
| 5,246,540 A | 9/1993 | Soda |
| 5,251,980 A | 10/1993 | Hiraoka et al. |
| 5,277,715 A | 1/1994 | Cathey ........................... 134/2 |
| 5,378,308 A | 1/1995 | Thoms |
| 5,389,148 A | 2/1995 | Matsunaga |
| 5,429,711 A | 7/1995 | Watanabe et al. |
| 5,434,433 A | 7/1995 | Takasu et al. |
| 5,505,804 A | 4/1996 | Mizuguchi et al. |
| 5,540,784 A | 7/1996 | Ranes ......................... 134/10 |
| 5,543,181 A | 8/1996 | Fehn et al. |
| 5,571,599 A * | 11/1996 | Eichhorn et al. ............ 428/167 |
| 5,654,057 A | 8/1997 | Kitayama et al. ........... 428/64.1 |
| 5,766,493 A | 6/1998 | Shin |
| 5,788,871 A | 8/1998 | Huh |
| 5,808,715 A | 9/1998 | Tsai et al. |
| 5,818,559 A | 10/1998 | Yoshida ...................... 349/122 |
| 5,819,434 A | 10/1998 | Herchen et al. .............. 34/232 |
| 5,835,176 A | 11/1998 | Jeong et al. |

\* cited by examiner

GLASS SUBSTRATE FOR LIQUID CRYSTAL DISPLAY DEVICE

This application claims the benefit of Korean Patent Application No. 1998-44375, filed on Oct. 22, 1998, which is hereby incorporated by reference.

BACKGROUND OF THE INVENTION

1. Field of the Invention

The present invention relates to a liquid crystal display device, more particularly, to a glass substrate for liquid crystal display device.

2. Discussion of the Related Art

Although portable televisions and notebook computers having liquid crystal displays (LCDs) have been in the market, there are various problems to be solved yet. Because these televisions and computers have portable electronics, the reduction of the size and weight is very important in the LCD research.

Recently, a study for small size and light weight portable television and notebook computer has been conducted deeply in order to increase the portability of these products.

There are various methods to reduce the size and weight of the LCD. It is difficult to reduce the number of the necessary elements of the LCD. In addition, the weight and size of the necessary elements are so small already that the weight and size of the necessary elements can hardly be reduced. For the glass substrate which is a basic element of the LCD, there is the possibility of weight reduction. In particular, the weight reduction of the glass substrate is a very important technique because of its large portion of total weight of the LCD.

To reduce the weight of the glass substrate means to make the substrate thinner. The glass processing technique is a very difficult technique, however, because the processed thin glass is easily damaged and its surface becomes rough.

The most useful method for weight reduction of the glass substrate is to etch the surface of the glass substrate by soaking the substrate in a container containing an etchant. In this method, however, the substrate is not etched uniformly because of the non-uniformity of the surface of the substrate. In addition, the impurities generated during the etching process is attached onto the surface of the substrate, so that the surface becomes rough.

To solve the above problem, the substrate is set up in the container containing the etchant and then $N_2$ bubbles are supplied to the surface of the substrate through a porous plate to remove the impurities attached onto the surface of the substrate and apply a new etchant to the surface of the substrate.

FIG. 1 is a top view showing a glass substrate of a conventional liquid crystal display device.

FIG. 1 includes two cells 10, 11 which should be laminated to each other, an exhausting port 13 for exhausting an inner gas, and a guide line 15 for preventing a corrosion of the cells 10, 11 by the etchant from an outer region of the substrate 20. Solid line arrows represent paths for exhausting a gas in the cells 10, 11 to the end region in the glass substrate 20. Dotted line arrows represent paths for exhausting the exhausted gas from the cells 10, 11 to the outer region of the glass substrate 20.

The guide line 15 is formed on the whole area of the substrate 20 to block the cells 10, 11 from an outer region of the substrate 20 except for the exhausting port 13.

In this method, however, in case of a liquid crystal display device having metal elements to be formed on the end surface of the substrate, metal elements are corroded by a partial permeation of the etchant such as HF(hydrofluoric acid) into the inner region of the substrate 20.

SUMMARY OF THE INVENTION

Accordingly, the present invention is directed to a glass substrate for liquid crystal display device that substantially obviates one or more of the problems due to limitations and disadvantages of the related art.

An object of the present invention is to provide a glass substrate for liquid crystal display device on which an exhausting port is provided for exhausting an inner gas and for preventing a corrosion of the cells by an etchant from an outer region of the glass substrate.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a plurality of zig-zag type exhausting ports are formed to exhaust the inner gas in the cells to the outer region of the glass substrate when the cells are laminated to each other. Further, opening regions except for the exhausting port are blocked by the residuum acting as a sealing material being generated when the substrate is etched by the etchant, thereby the metal elements on the array is prevented from the etchant.

The above sealant is printed as a minimum line width on the end surface of the substrate to prevent the permeation of the etchant.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTIONS OF THE PREFERRED EMBODIMENTS

Reference will now be made in detail to the preferred embodiment of the present invention, example of which is illustrated in the accompanying drawings.

Figure 1:
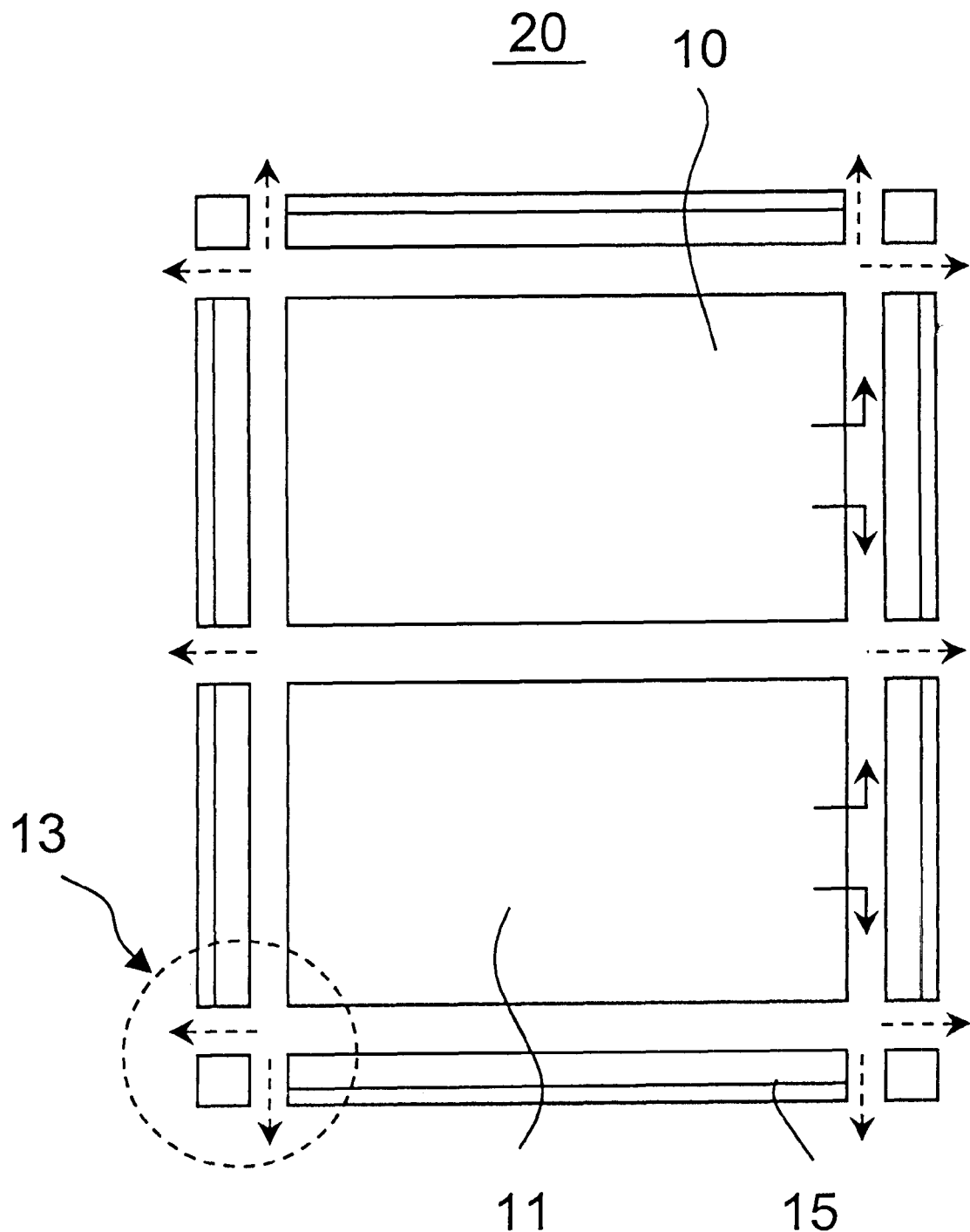
FIG. 1 is a top view showing a glass substrate of a conventional liquid crystal display device.
Figure 2:
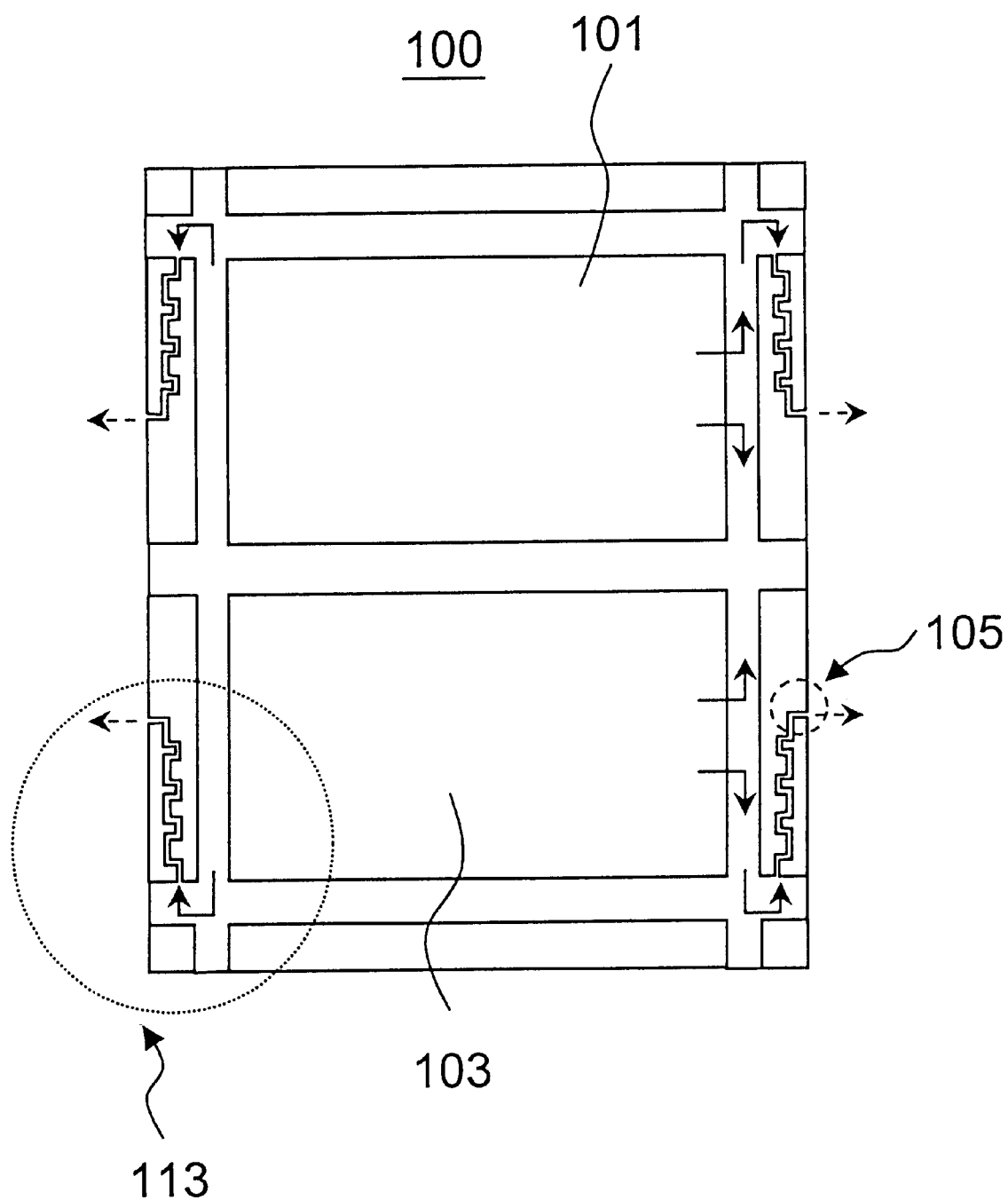
FIG. 2 is a top view showing a glass substrate according to a first embodiment of the present invention.

FIG. 2 is a top view showing a glass substrate according to a first embodiment of the present invention.

As shown in FIG. 2, a plurality of zig-zag type exhausting ports 105 are formed on the glass substrate 100 to exhaust the inner gas in the cells 101, 103 to the outer region of the glass substrate 100 when the cells 101, 103 are laminated to each other.

Further, the exhausting ports 105 is formed on lower sides and left and right sides of the glass substrate 100 in which the etchant is permeated when the glass substrate is provided in the etchant bath such as an HF bath.

In the drawing, solid line arrows represent paths for exhausting the inner gas in the cells 101, 103 to the end region in the glass substrate 100, and dotted line arrows represent paths for exhausting the exhausted gas from the cells 101, 103 to the outer region of the glass substrate 100.

Figure 3:
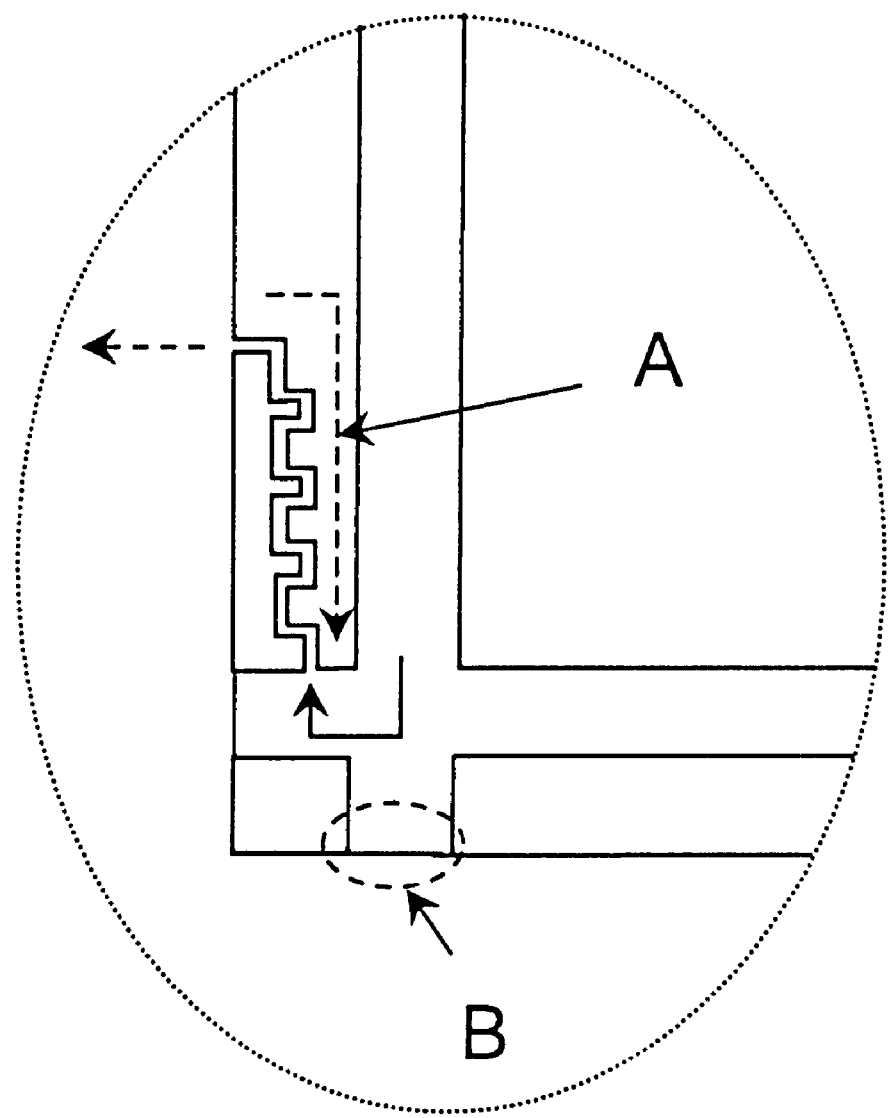
FIG. 3 is a partial enlarged view of a glass substrate as shown in FIG. 2

FIG. 3 is a partial enlarged view of a glass substrate as shown in FIG. 2.

As shown in FIG. 3, in region A, the sealant is printed as a minimum line width in consideration of the burst of the sealant, then in region B, the sealant is printed also as a minimum line width to prevent the permeation of the etchant when the cells are in the cutting process.

In the drawing, a solid line arrow represents path for exhausting the inner gas in the cell to the end region in the glass substrate, and a dotted line arrow represents path for exhausting the exhausted gas from the cell to the outer region of the glass substrate.

The sealant includes the residuum such as BaO(barium oxide), or CaO(calcium oxide) acting as a sealing material generated when the substrate is etched by the etchant. Thus, the metal elements on the array is prevented from the etchant.

Figure 4:
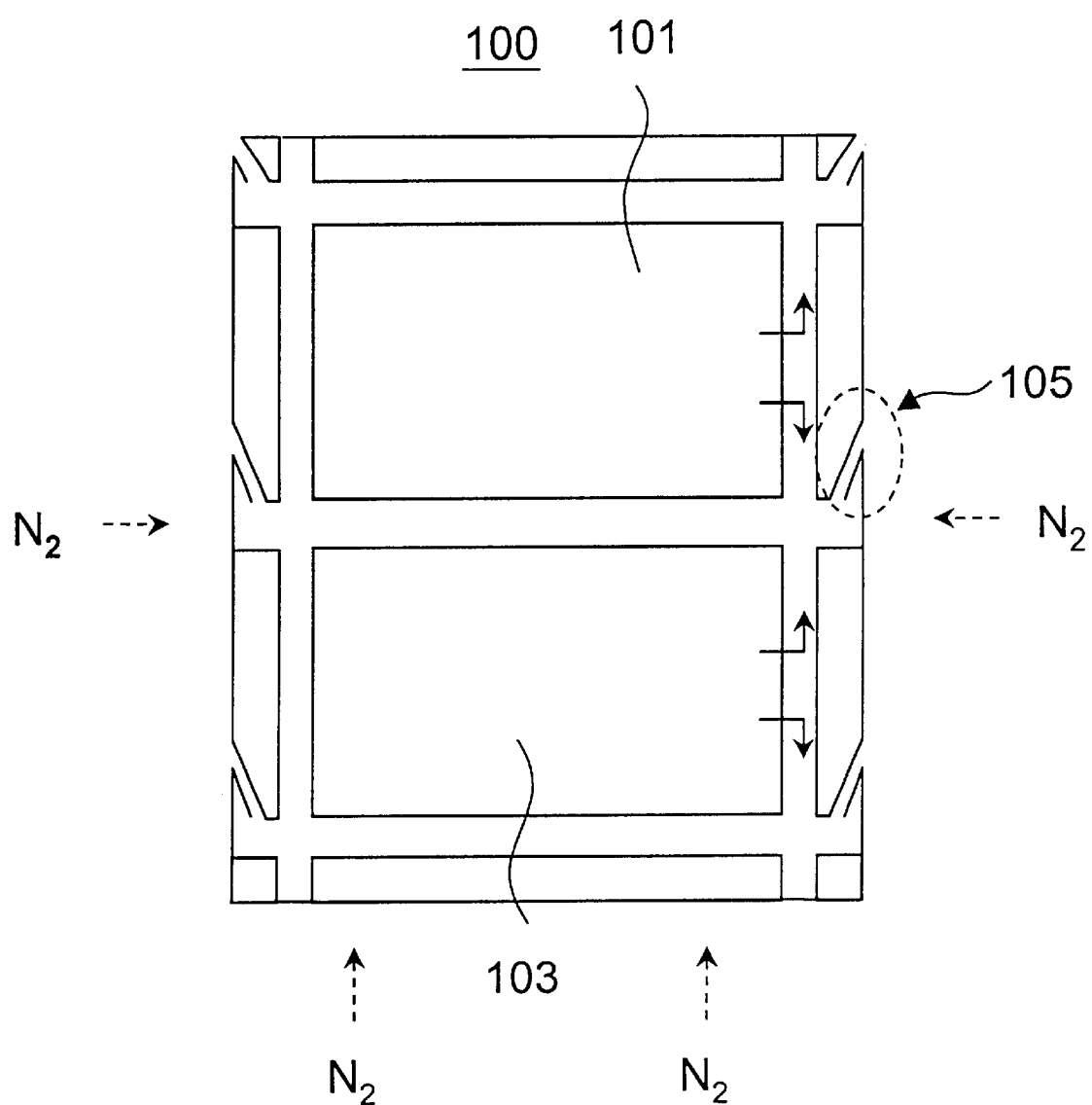
FIG. 4 is a top view showing a glass substrate according to a second embodiment of the present invention.

FIG. 4 is a top view showing a glass substrate according to a second embodiment of the present invention, in this embodiment, an outlet of the exhausting port 105 is formed in a counter direction to a flowing direction of the outer gas such as $N_2$ bubble which is provided so as to remove the impurities on the surface of the glass substrate 100 for the etching process of the glass substrate 100. Thus, the cells 101, 103 is prevented from the etchant.

By the glass substrate for liquid crystal display device according to the present invention, since a plurality of zig-zag type exhausting ports are formed on the end sides or portions of the glass substrate to exhaust the inner gas in the cells to the outer region of the glass substrate when the cells are laminated to each other. Also, opening regions except for the exhausting port are blocked by the residuum generated when the substrate is etched by the etchant. Accordingly, the cells and the metal elements to be formed on the array are prevented from the etchant.

It will be apparent to those skilled in the art that various modifications and variation can be made in the glass substrate for a liquid crystal display device of the present invention without departing from the spirit or scope of the invention. Thus, it is intended that the present invention cover the modifications and variations of this invention provided they come within the scope of the appended claims and their equivalents.

What is claimed is:

1. A glass substrate for liquid crystal display device comprising:
   a plurality of exhausting ports on a glass substrate having two cells, the two cells being laminated to each other, wherein said exhausting ports exhaust an inner gas in said cells to an outer region of said glass substrate when said cells laminated to each other and opening regions of said glass substrate except for said exhausting port are blocked by the residuum being generated when said glass substrate is etched by the etchant.

2. The glass substrate of claim 1, wherein an outlet of said exhausting port is formed in counter direction to a flowing direction of an outer gas.

3. The glass substrate of claim 1, wherein said etchant includes a hydrofluoric acid.

4. The glass substrate of claim 2, wherein said outer gas includes a nitrogen gas.

5. A glass substrate for a liquid crystal display device comprising:
   first and second substrates, at least one of the first and second substrates being etched by an etchant; and
   a plurality of exhausting ports on at least one of the first and second substrates, the exhausting ports exhausting an inner gas to an outer region of the glass substrate.

6. The glass substrate for liquid crystal display device of claim 5, wherein the exhausting ports include a zigzag structure.

7. The glass substrate for liquid crystal display device of claim 5, wherein at least one of the exhausting ports is at a lower side of the glass substrate.

8. The glass substrate for liquid crystal display device of claim 5, wherein the exhausting port is at left and right sides of the glass substrate.

9. The glass substrate for liquid crystal display device of claim 5, wherein the exhausting port is in a counter direction to a flowing direction of an outer gas.

10. The glass substrate for liquid crystal display device of claim 9, wherein the outer gas includes a nitrogen gas.

11. The glass substrate for liquid crystal display device of claim 5, wherein the etchant includes hydrofluoric acid.

12. The glass substrate for liquid crystal display device of claim 5, further comprising an opening region of the glass substrate except for the exhausting port.

13. A method of fabricating a liquid crystal display device having a glass substrate and first and second cells, the two cells for being laminated with each other, comprising:
   forming a plurality of exhausting ports on the glass substrate, the glass substrate having opening regions other than said exhausting ports;
   exhausting an inner gas in the first and second cells through said exhausting ports to an outer region of the glass substrate when said cells are laminated to each other; and
   blocking the opening regions of said glass substrate by residues generated when the substrate is etched by the etchant.

14. The method of claim 13, wherein the exhausting port has an outlet formed in a counter direction to a flowing direction of an outer gas.

15. The method of claim 14, wherein the outer gas includes nitrogen gas.

16. The method of claim 13, wherein the etchant includes hydrofluoric acid.

17. The method of claim 13, wherein the exhausting ports have a zigzag shape.

18. The method of claim 13, wherein at least one of the exhausting ports is at a lower side of the glass substrate.

19. The method of claim 13, wherein the exhausting port is at left and right sides of the glass substrate.

20. The method of claim 13, wherein the exhausting port is in a counter direction to a flowing direction of an outer gas.

21. The method of claim 20, wherein the outer gas includes nitrogen gas.

22. The glass substrate of claim 1, wherein the exhausting ports include a zigzag shape.

23. A method of forming a glass substrate for a liquid crystal display device having first and second substrates by an etchant; and etching a least one of the first and second substrates by an etchant; and forming a plurality of exhausting ports on at least one of the first and second substrates, the exhausting ports exhausting an inner gas to an outer region of the glass substrate.

24. A glass substrate for a liquid crystal display device comprising:

first and second substrates, at least one of the first and second substrates being etched by an etchant; and a plurality of zigzag exhausting ports on at least one of the first and second substrates.

25. The glass substrate for the liquid crystal display device of claim 24, wherein the exhausting ports exhausting an inner gas to an outer region of the glass substrate; and an outlet formed on one of the plurality of zigzag exhausting ports,wherein the outlet is formed in a counter direction to a flowing direction of an outer gas.

* * * * *